(12) United States Patent
Cruse et al.

(10) Patent No.: US 8,931,512 B2
(45) Date of Patent: Jan. 13, 2015

(54) GAS DELIVERY SYSTEM AND METHOD OF USE THEREOF

(75) Inventors: James P. Cruse, Santa Cruz, CA (US); Ezra Robert Gold, Sunnyvale, CA (US); John W. Lane, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 226 days.

(21) Appl. No.: 13/414,217

(22) Filed: Mar. 7, 2012

(65) Prior Publication Data

US 2012/0227817 A1 Sep. 13, 2012

Related U.S. Application Data

(60) Provisional application No. 61/449,938, filed on Mar. 7, 2011.

(51) Int. Cl.
*F16K 11/22* (2006.01)
*B01F 3/02* (2006.01)
*G05D 11/13* (2006.01)

(52) U.S. Cl.
CPC .............. *B01F 3/028* (2013.01); *G05D 11/132* (2013.01)
USPC .......... 137/606; 137/88; 137/597; 137/599.03

(58) Field of Classification Search
CPC ...... F16K 19/00; F16K 27/003; G05D 11/132
USPC ................. 137/88, 597, 606, 599.01, 599.03
See application file for complete search history.

(56) References Cited

U.S. PATENT DOCUMENTS

| | | | | |
|---|---|---|---|---|
| 3,905,384 | A * | 9/1975 | Berger | 137/111 |
| 4,498,496 | A * | 2/1985 | Barcellona et al. | 137/599.04 |
| 4,734,371 | A * | 3/1988 | Schmolke et al. | 435/286.6 |
| 6,772,781 | B2 * | 8/2004 | Doty et al. | 137/9 |
| 7,673,645 | B2 * | 3/2010 | Ding et al. | 137/9 |
| 2002/0083984 | A1 * | 7/2002 | Easton | 137/602 |
| 2005/0241763 | A1 * | 11/2005 | Huang et al. | 156/345.33 |
| 2008/0115834 | A1 * | 5/2008 | Geoffrion et al. | 137/9 |
| 2008/0202609 | A1 * | 8/2008 | Gold et al. | 137/597 |
| 2010/0154908 | A1 * | 6/2010 | Uchida et al. | 137/606 |

\* cited by examiner

*Primary Examiner* — John Rivell
*Assistant Examiner* — Reinaldo Sanchez-Medina
(74) *Attorney, Agent, or Firm* — Moser Taboada; Alan Taboada

(57) ABSTRACT

Methods and apparatus for delivery of gas are provided herein. In some embodiments, a gas delivery system may include a premix tank having an inlet and an outlet; a plurality of gas supplies coupled to the inlet of the premix tank; a plurality of valves, each valve respectively disposed in line with a corresponding one of the plurality of gas supplies; and a conduit coupling the outlet of the premix tank to one or more gas delivery zones.

18 Claims, 10 Drawing Sheets

US 8,931,512 B2

GAS DELIVERY SYSTEM AND METHOD OF USE THEREOF

CROSS-REFERENCE TO RELATED APPLICATIONS

This application claims benefit of U.S. provisional patent application Ser. No. 61/449,938, filed Mar. 7, 2011, which is herein incorporated by reference.

FIELD

Embodiments of the present invention generally relate to semiconductor substrate processing.

BACKGROUND

Semiconductor manufacturing processes utilize a wide variety of gases that are provided to processing equipment (e.g., cluster tool, process chamber, or the like) via gas delivery systems that are coupled to, or embedded, in the processing equipment. As semiconductor process recipes become more sophisticated, an increased number of process gases and varying ratios of process gases are required, therefore requiring the need for increasingly complex gas delivery systems. For example, the inventors have observed that in conventional gas delivery systems, for each process gas added to a process recipe, additional hardware (e.g. mass flow controller, gas conduits, valves and the like) needs to be added to the gas delivery system. Such additions increase the cost and size of the gas delivery system, thereby becoming a limiting factor in the design and implementation of processing equipment.

To reduce the cost and size of the gas delivery system, conventional gas delivery systems may utilize commercially available premixed gas supplies having a premixed amount of desired process gases. However, premixed gas supplies only provide a fixed mixture of process gases and, therefore, limit the amount of gas mixtures that may be provided.

Thus, the inventors have provided an improved gas delivery system and method of use thereof.

SUMMARY

Methods and apparatus for delivery of gas are provided herein. In some embodiments, a gas delivery system for a process chamber may include a premix tank having an inlet and an outlet; a plurality of gas supplies coupled to the inlet of the premix tank; a plurality of valves, each valve respectively disposed in line with a corresponding one of the plurality of gas supplies; and a conduit coupling the outlet of the premix tank to one or more gas delivery zones.

In some embodiments, a gas delivery system may include a pressure vessel having an inlet and an outlet; a plurality of gas supplies coupled to the inlet of the pressure vessel via a respective plurality of valves to selectively flow one or more gases from the plurality of gas supplies into the pressure vessel; a conduit coupling the outlet of the pressure vessel to one or more gas delivery zones; and a valve disposed in line with the outlet of the pressure vessel to selectively flow the one or more gases from the pressure vessel to the one or more gas delivery zones.

In some embodiments, a method of providing gas to a gas delivery zone may include providing a first gas from a first gas supply to a first premix tank coupled to one or more gas delivery zones; providing a second gas from a second gas supply to the first premix tank; mixing the first gas and second gas in the first premix tank to form a first mixed gas; and providing the first mixed gas from the first premix tank to the one or more gas delivery zones. The timing and reusability of the premix apparatus as disclosed herein may facilitate complex next generation applications having tens of steps with, for example, 18 or more gas mixes.

Other and further embodiments of the present invention are described below.

BRIEF DESCRIPTION OF THE DRAWINGS

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

Figure 1:
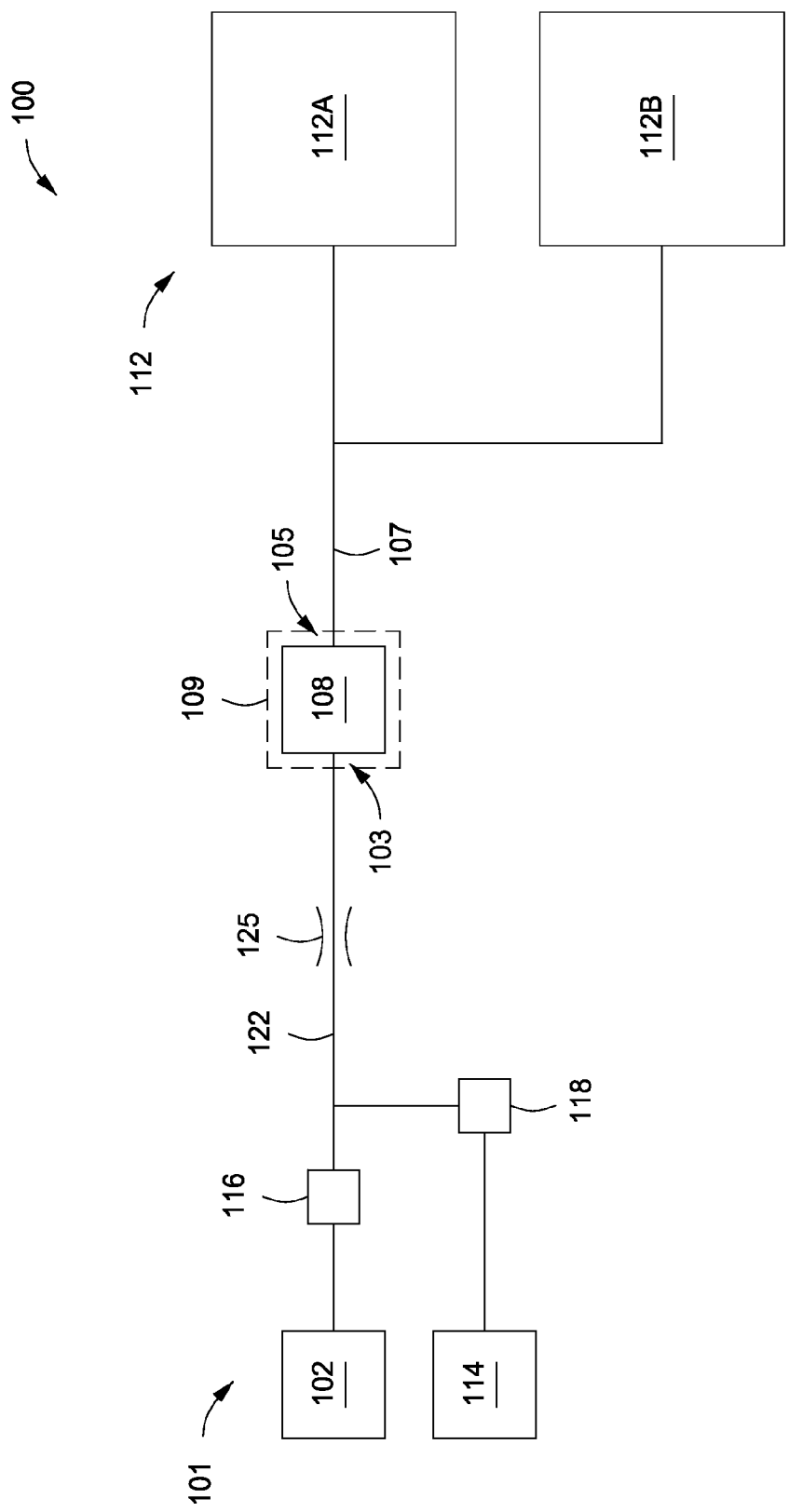
FIG. 1 is a schematic depiction of a gas delivery system in accordance with some embodiments of the present invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention provide gas delivery systems and methods of use thereof. In some embodiments, the inventive gas delivery system may advantageously premix separate process gases prior to delivering the process gases to processing equipment at a desired flow rate. In some embodiments, the inventive gas delivery system may advantageously provide for additional process gases to be added to a process recipe with reduced hardware as compared to conventional gas delivery systems. In some embodiments, the gas delivery system may advantageously have a smaller size and lower cost as compared to conventional gas delivery systems. In some embodiments, the inventive gas delivery system may advantageously process gases to be adjusted during a process as needed, thereby providing increased flexibility over conventional gas delivery systems. The timing and reusability of the premix apparatus as disclosed herein may facilitate complex next generation applications having tens of steps with, for example, 18 or more gas mixes.

As shown in FIG. 1, in some embodiments the gas delivery system 100 may generally comprise a premix tank 108 (e.g., a pressure vessel) having a plurality of gas supplies 101 (e.g., a first gas supply 102 and a second gas supply 114 as shown in FIG. 1) coupled to the premix tank 108. For example, the plurality of gas supplies 101 may be coupled to an inlet 113 of the premix tank 108 via a conduit 122. In some embodiments, a flow restrictor 125 may be coupled to the conduit 122 to restrict the flow of gases as they flow into the premix tank 108. The plurality of gas supplies 101 may be controlled, as discussed below, to provide two or more gases to the premix tank 108 to form a premixed gas in the premix tank having a desired ratio.

The premix tank 108 is further coupled to one or more gas delivery zones 112 (e.g., a first gas delivery zone 112A and a second gas delivery zone 112B, as shown in FIG. 1). For example, the one or more gas delivery zones 112 may be coupled to an outlet 105 of the premix tank 108 via a conduit 107 to deliver the premixed gas from the premix tank 108 to the one or more gas delivery zones 112.

The gas delivery system 100 may be used either as a sole source of process gases to be provided to the one or more gas delivery zones 112, or in conjunction with one or more additional gas delivery systems (not shown). For example, in some embodiments, an additional gas source (not shown) may be coupled to the one or more gas delivery zones 112 to provide additional gases in an intermittent or constant flow, for example but not limited to, a purge gas or an inert gas.

In some embodiments, a plurality of valves (two valves shown 116, 118) may be coupled to gas supplies 102, 114 to allow each of the plurality of gas supplies 102, 114 to provide one or more process gases to the premix tank 108 in a desired amount, such that the combination of gases in the premix tank may have a desired composition. In such embodiments, each valve 116, 118 may be respectively disposed in line with a corresponding one of the gas supplies 102, 114, as shown in FIG. 1. The valves 116, 118 may be any type of valve, for example, such as a switching valve, high speed valve, stop valve, or the like. In some embodiments the valves 116, 118 may be a two-way valve, for example a diverter valve configured to divert the flow of the one or more gases from the gas supplies 102, 114 away from the premix tank 108 and toward, for example, a foreline or exhaust line (not shown).

Figure 1A:
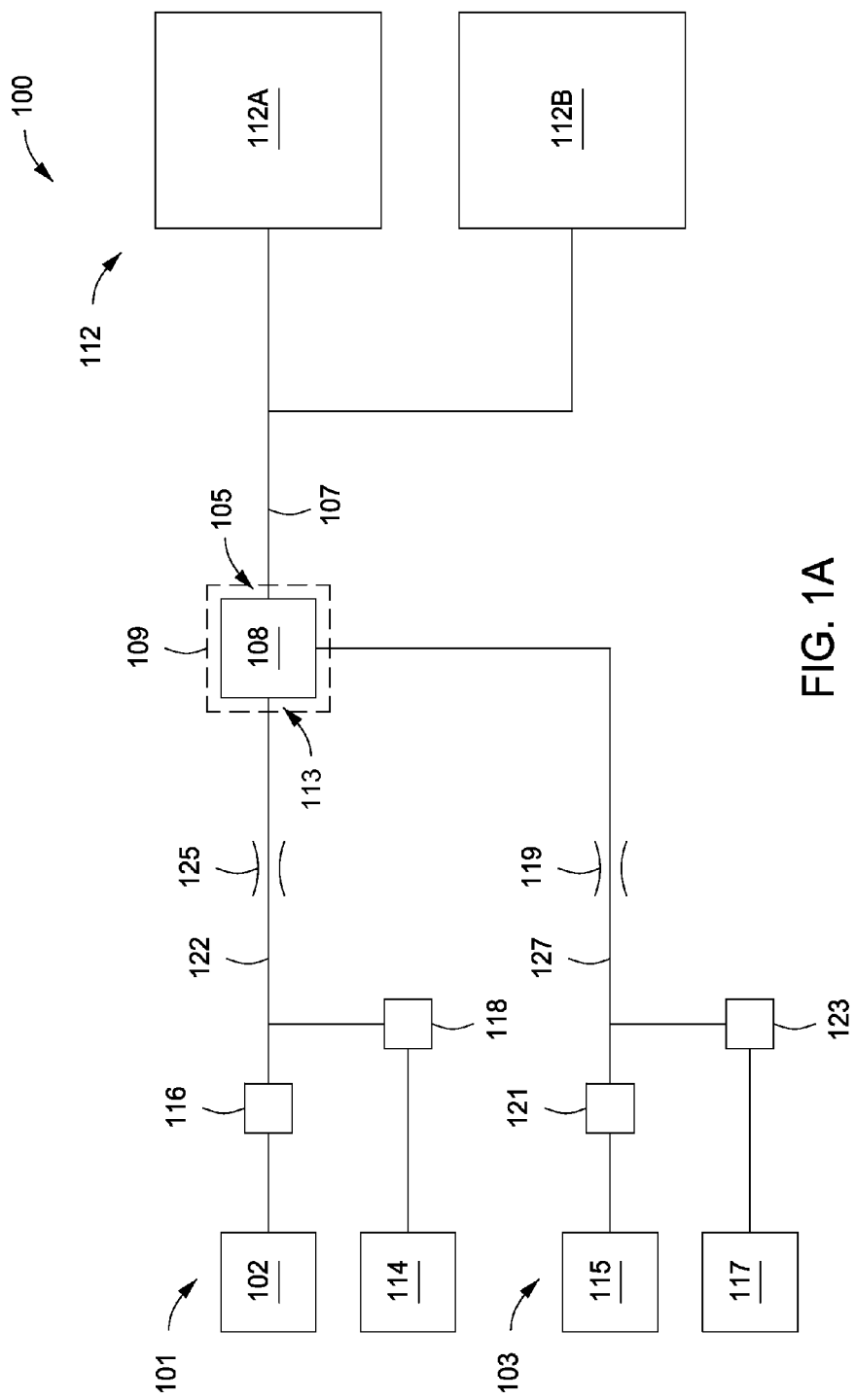
FIGS. 1A-B are schematic depictions of a gas delivery system in accordance with some embodiments of the present invention.

Referring to FIG. 1A, in some embodiments, additional gas supplies 103 may be coupled to the premix tank 108. For example, in some embodiments, one or more gas supplies (two gas supplies 115, 117 shown) may be coupled to the premix tank 108 via a conduit 127. In such embodiments, a valve 121, 123 may be disposed in line with each gas supply 115, 117 to allow each of the plurality of gas supplies 115, 117 to provide one or more process gases to the premix tank 108 in a desired amount, such that the combination of gases in the premix tank may have a desired composition. In addition, in some embodiments, a flow restrictor 119 may be coupled to the conduit 127 to restrict the flow of gases as they flow into the premix tank 108. When present, the additional gas supplies 103 may be utilized simultaneously with or independently of the gas supplies 101.

Referring back to FIG. 1, in operation of the gas delivery system 100, each of the plurality of gas supplies 101 is utilized to provide a process gas to the premix tank 108 in a desired amount to create a desired ratio of process gases in the premix tank 108. For example, in some embodiments, a first gas supply (e.g., gas supply 102) may provide a first process gas to the premix tank 108 in a desired amount via a first valve (e.g., valve 116), followed by a second gas supply (e.g., gas supply 114) then providing a second process gas to the premix tank 108 in a desired amount via a second valve (e.g., valve 118). The first process gas and second process gas mix in the premix tank 108, thereby creating the desired ratio of process gases. The mixed process gases may then be delivered from the premix tank 108 to the one or more gas delivery zones 112 via the conduit 107 coupled to the outlet 105 of the premix tank 108.

Although the exemplary operation of the gas delivery system 100 above describes the process gases being provided in a sequential manner, the process gases may be provided in any manner suitable to achieve a desired ratio of process gases in a mix tank. For example, in some embodiments, the process gases may be provided simultaneously in controlled ratio by utilizing the valves (valves 116, 118). In addition, in embodiments where additional gas supplies are present (e.g., such as the gas supplies 103 shown in FIG. 1A), all or any of the individual gas supplies may be used to provide their respective gases sequentially, simultaneously, or in combinations thereof.

By providing the gases in the manner described above (i.e., providing gases sequentially or in a controlled ratio simultaneously), the amounts of each gas may be adjusted during a process as needed, thereby providing increased flexibility over conventional gas delivery systems.

The one or more gas supplies 101 (e.g., 102, 114) may be any type of gas supply configured to provide any gases (e.g., precursors, carrier gases, process gases, purge gases, cleaning gases, or the like) needed to perform an operation or process in the gas delivery zones 112A, 112B. For example, in some embodiments, the gas supplies 102, 114 may comprise one or more gas sources, for example, such as a gas tank, cryogenic tank, solid or liquid containing ampoules, or the like. In some embodiments, the one or more gas supplies 101 may be part of a facility gas feed system. In embodiments where one or more of the gas supplies 102, 114 comprise more than one gas source, the gas sources may be coupled to one another via a gas panel or manifold. Although only two gas supplies 102, 114 are shown in FIG. 1, the gas delivery system 100 may comprise any amount of gas supplies needed to provide any desired number of gases to the gas delivery zones 112A, 112B.

The one or more gas delivery zones 112 may be any gas zones of any type of equipment in which the two or more gases may be utilized, such as a process chamber, cluster tool, or the like. Although only two gas delivery zones 112A, 112B are shown in FIG. 1, the gas delivery system 100 may comprise any amount of gas delivery zones suitable to perform a desired process. For example, in some embodiments, each of the one or more gas delivery zones 112 may be coupled to corresponding zones of a single piece of processing equipment (e.g., a single process chamber having the one or more gas delivery zones). For example, in some embodiments, each of the gas delivery zones 112A, 112B may be a gas zone of a multiple gas zone process chamber. In some embodiments, the one or more gas delivery zones 112 may be one or more zones of multiple pieces of processing equipment. For example, a first gas delivery zone may be a first process chamber and a second gas delivery zone may be a second process chamber (e.g., each of the gas delivery zones 112A, 112B may be separate process chambers). Alternatively, a first gas delivery zone may be a first zone in each of a first process chamber and a second process chamber, and a second gas delivery zone may be a second zone in each of the first and second process chambers. Although the above non-limiting examples describe two gas delivery zones (and two zones or two process chambers), the inventive gas delivery system described herein may be utilized in other variations as well— such as but not limited to single chambers having more than two gas delivery zones, more than two process chambers, and the like.

The premix tank 108 may be any size suitable to accommodate a desired volume of gases to be supplied to the gas delivery zones 112A, 112B. In embodiments where more than one premix tank 108 is utilized (e.g., as described below) the premix tanks may be the same size, or in some embodiments, a different size. In addition, the premix tank 108 may be constructed of any material suitable to hold the particular gases being provided from the gas supplies 102, 114. Although only one premix tank 108 is shown in FIG. 1, the gas delivery system 100 may comprise any amount of premix tanks needed to facilitate providing the two or more gases to the gas delivery zones 112A, 112B in accordance with various process recipes (e.g., varying gas ratios, amount of each gas mixture needed, or the like), for example, such as 2 or more premix tanks, or in some embodiments, more than 4 premix tanks, or in some embodiments between about four to about 10 premix tanks.

For example, in some embodiments, the gas supplies 102, 114 may provide the two or more gases to two or more premix tanks disposed in a parallel arrangement and configured to each deliver the mixed gases to the gas delivery zones. In such an arrangement, the first premix tank may be used while the second premix tank is being filled (although they may both be filled prior to use). Also, the first and second premix tanks may contain different compositions of gases for use, for example, in different recipe steps or the like.

Alternatively or in combination, in some embodiments, the gas supplies 102, 114 may provide the one or more gases to two or more premix tanks disposed in a parallel arrangement and configured to each deliver the mixed gases to separate gas delivery zones. Alternatively, or in combination, in some embodiments, one or more additional premix tanks may be disposed downstream of the one or more premix tanks to facilitate a multi-step gas mixing process. In such embodiments, the downstream premix tanks may receive the gases from one or more upstream premix tanks, allowing the gases from the upstream premix tanks to mix in the downstream tanks prior to delivery to the gas delivery zones 112A, 112B.

Figure 1B:
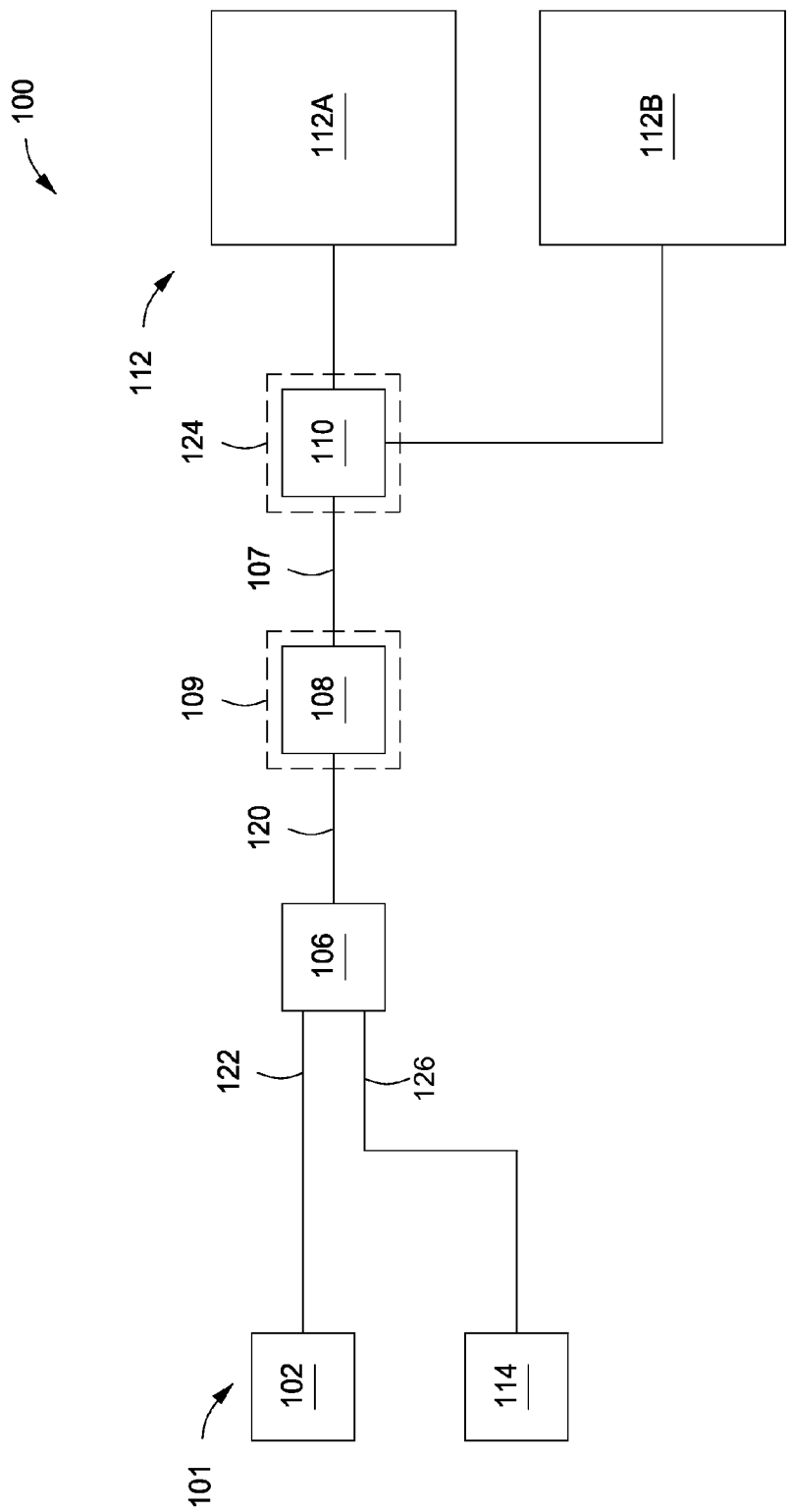

Referring to FIG. 1B, in some embodiments, the gas delivery system 100 may further comprise a single line drop gas box 106. The single line drop gas box 106 may include one or more flow paths having one or more valves configured to selectively allow the flow of gas through the one or more flow paths (described below with respect to FIG. 2). When present, the single line drop gas box 106 receives the one or more gases from the gas supplies 102, 114 via a conduit 122, 126 for each gas supply 102, 114 and provides the one or more gases to the premix tank via the conduit 120. In some embodiments, utilizing the single line drop gas box 106 (or the single line drop gas box 106 contained within the pre-mix gas box 109 as described below) may allow for the gas delivery system 100 to be utilized as a standalone system to deliver processes gases to a processing system remotely, or embedded within a processing system.

Figure 2:
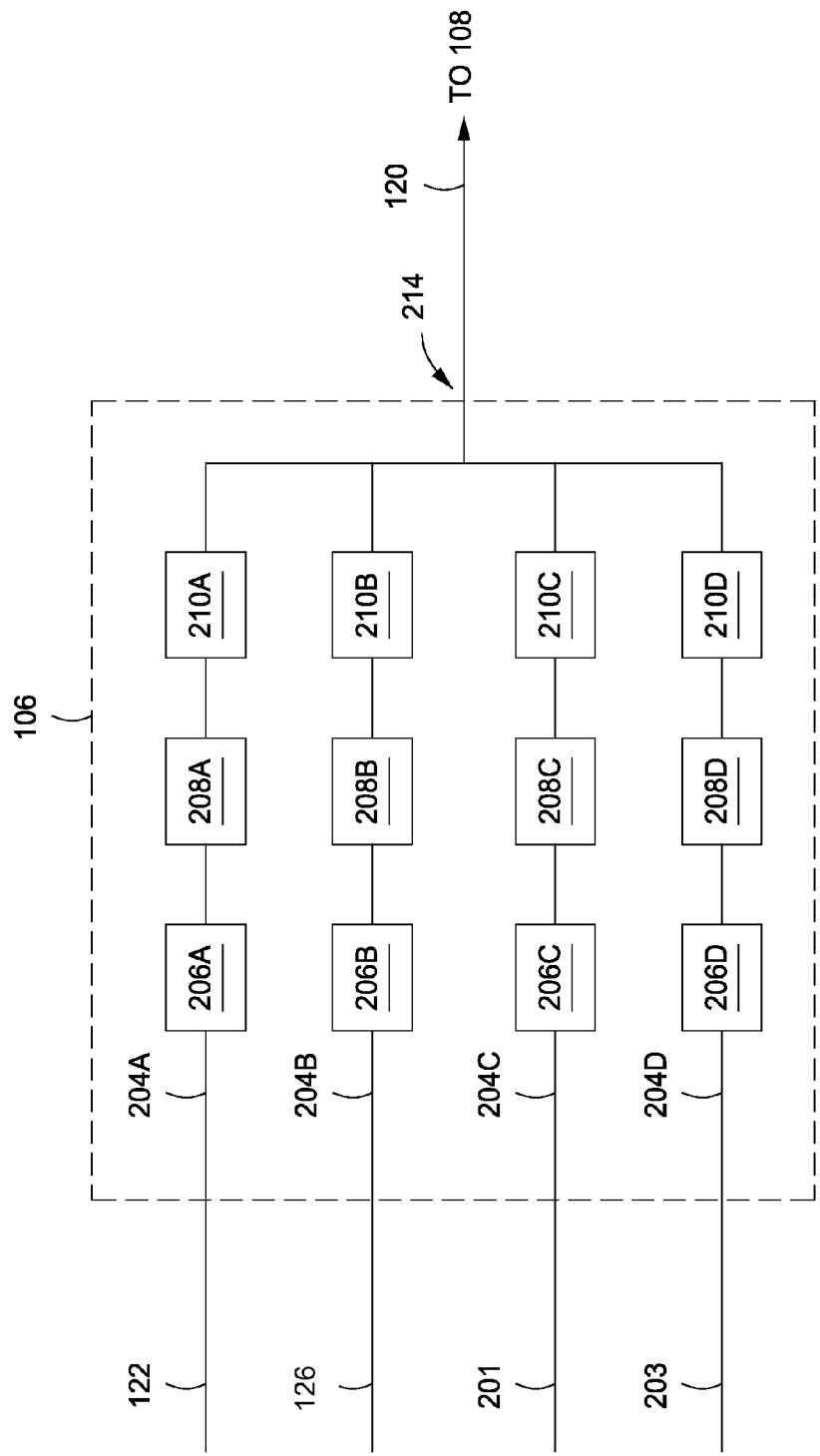
FIGS. 2-2A are schematic depictions of a single line drop gas box of a gas delivery system in accordance with some embodiments of the present invention.
Figure 2A:
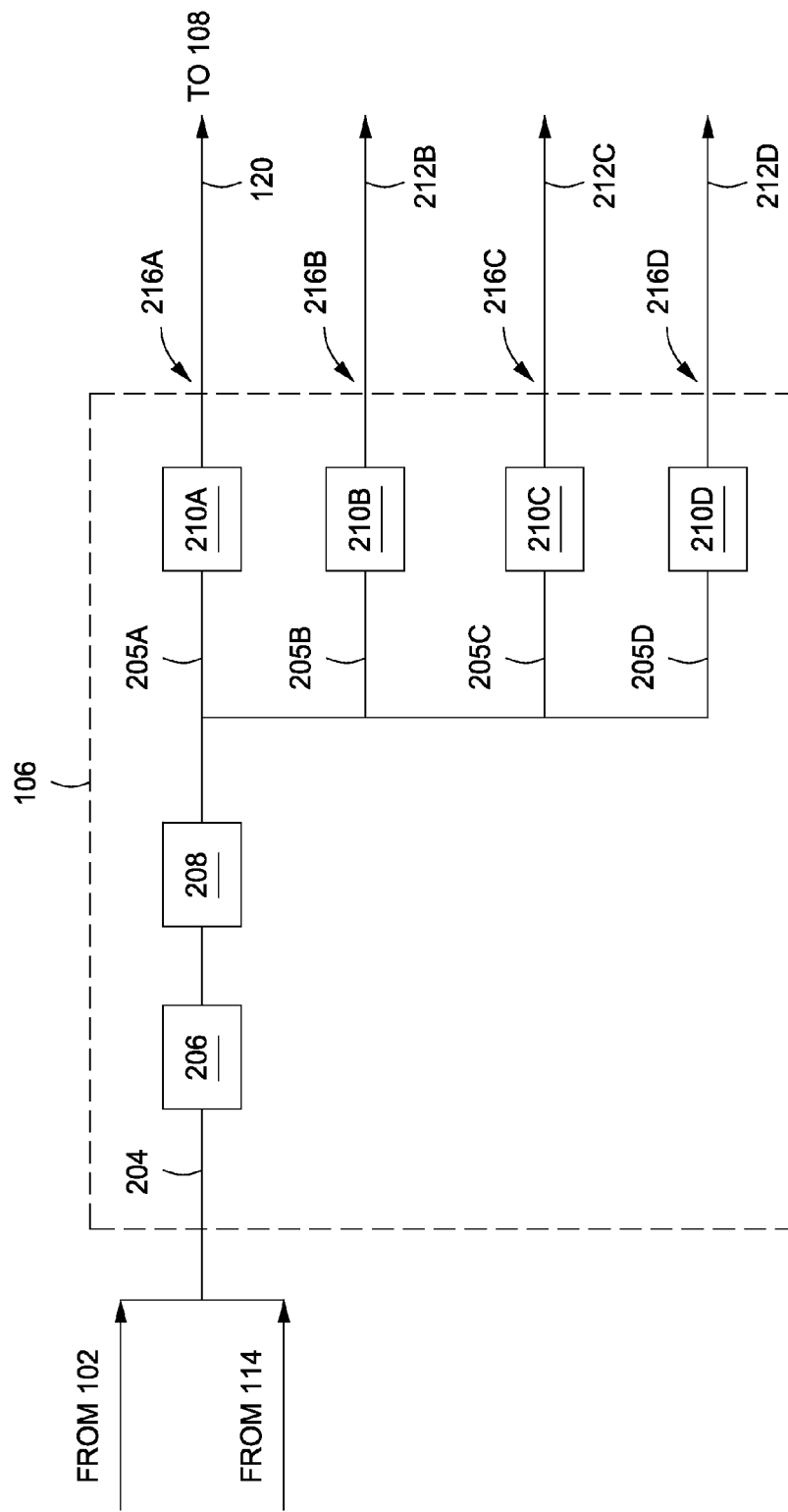

Referring to FIG. 2, in some embodiments, the single line drop gas box 106 may generally comprise one or more flow paths (four flow paths 204A-D shown) configured to receive the two or more gases from respective conduits (conduits 122, 126, 201, 203 shown) and provide the two or more gases to an outlet 214 coupled to a conduit 120. Although four flow paths 204A-D are shown, any number of flow paths may be provided to accommodate for any number of gas supplies. Alternatively, in some embodiments, the gas supplies 102/114 may provide the gases to one flow path 204, for example as shown in FIG. 2A. In such embodiments, the flow path 204 may split the flow of the gases to one or more flow paths (four flow paths 205A-D shown) to one or more outlets (four outlets 216A-D shown) coupled to one or more respective flow paths (four flow paths: conduits 120 and 212B-D shown), each flow path having a valve 210A-D to facilitate isolating the respective flow path. In addition, in such embodiments, the flow path may comprise one or more valves (one valve 206 shown) to facilitate isolating the line drop gas box 106 and optionally one or more purifiers or filters (one purifier or filter 208 shown) to remove moisture, contaminants, metals, or the like from the gases.

For clarity, only one flow path 204A will be described below. However, the following description may apply to any of the flow paths utilized in the single line drop gas box 106. In addition, although described as being contained within the single line drop gas box 106, the elements described herein may also be provided, in whole or in part, in separate housings or without a housing.

Referring back to FIG. 2, for clarity, in some embodiments, the flow path 204A may comprise a valve 206A (valves 206B-D for flow paths 204B-D shown) configured to selectively allow a flow of gas through the flow path 204A. The valve 206A may be any type of valve, for example, such as a switching valve, high speed valve, stop valve, or the like. In some embodiments, the flow path 204A may further comprise a purifier or filter 208A (purifiers or filters 208B-D for flow paths 204B-D shown) to remove moisture, contaminants, metals, particles or the like from the gases. In some embodiments, the flow path 204A may further comprise a second valve 210A (valves 210B-D for flow paths 204B-D shown) to facilitate isolating the flow path 204A or removing the single line drop gas box 106 from the gas delivery system 100 for, for example, maintenance, replacement, cleaning, safety, or the like.

Figure 3:
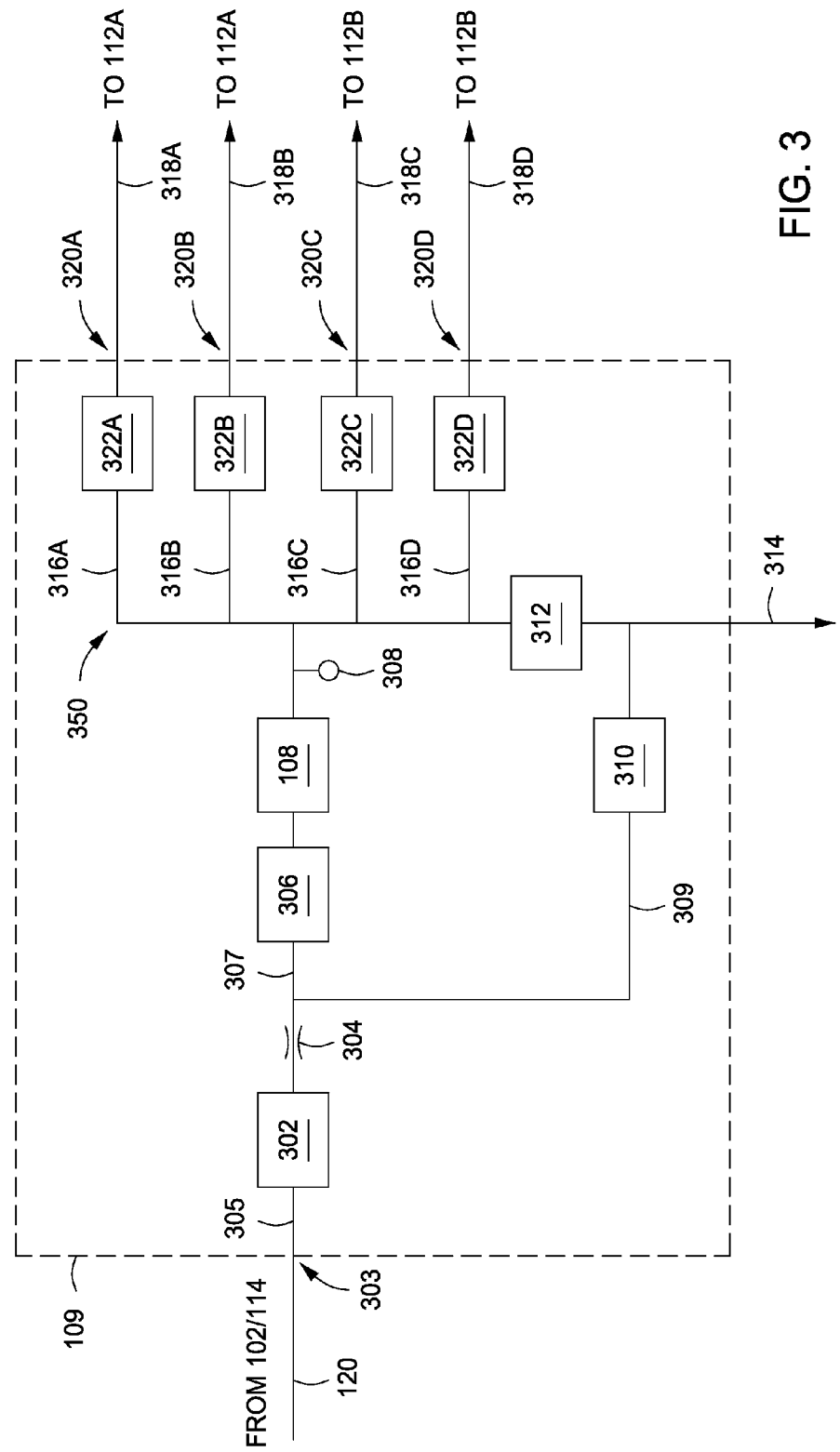
FIG. 3 is a schematic depiction of a gas mix box of a gas delivery system in accordance with some embodiments of the present invention.

As shown in FIGS. 1-1B, in some embodiments, the premix tank 108 may be confined within a premix gas box 109. For example, referring to FIG. 3, in some embodiments, the premix gas box 109 may generally comprise an inlet 303 configured to receive gas from the conduit 120 and the premix tank 108 configured to provide the mixed gases to one or more flow paths (four flow paths 316A-D shown) via a manifold 350. The one or more flow paths 316A-D are configured to provide the mixed gases to one or more conduits (four conduits 318A-D shown) via one or more outlets (four outlets 320A-D shown). Although four flow paths 316A-D are shown, any number of flow paths may be provided to provide the gases to any number of gas delivery zones (described above with respect to FIG. 1-1B). For example, as shown in FIG. 3, each of the four flow paths 316A-D may provide the gases supplied by the gas supplies 102/114 to four separate gas delivery zones. For clarity only one flow path 316A will be described below. However, the following description may apply to any number of flow paths utilized in the premix gas box 109. In addition, although described as being contained within the premix gas box 109, the elements described herein may also be provided in whole or in part, in separate housings or without a housing.

In some embodiments, the premix gas box 109 comprises a first flow path 305 for receiving the two or more gases from the inlet 303 and providing the two or more gases to the pre mix tank 108. The first flow path 305 may include a valve 302 to facilitate isolating the premix gas box 109 and/or removing the premix gas box 109 from the gas delivery system 100, for example, for maintenance, replacement, cleaning, safety, or the like. The valve 302 may be any type of valve, for example, such as a switching valve, high speed valve, stop valve, or the like. In some embodiments, the first flow path 305 may further comprise a flow restrictor 304 to restrict the flow of the two or more gases as they flow into the premix tank 108.

In some embodiments, the first flow path 305 may split into a second flow path 307 for providing the two or more gases to the premix tank 108 and a third flow path 309 for providing the two or more gases to the foreline 314. Two or more valves (two valves, a tank valve 306 and flow valve 310 shown) may be disposed along the second flow path 307 and/or third flow path 309 to allow the two or more gases to be selectively provided to the premix tank 108 or the foreline 314. The two or more valves may be any type of valve, for example, such as a switching valve, high speed valve, stop valve, or the like.

In operation, to fill the premix tank 108, the tank valve 306 is opened and the flow valve 310 is closed, thereby allowing a first gas from one of the gas supplies 102/114 to flow into the premix tank 108. In some embodiments, as the premix tank 108 is filled with the first gas, the internal pressure of the premix tank 108 may be monitored via a pressure gauge 308 fluidly coupled to the premix tank 108 (e.g., disposed downstream of the premix tank 308 as shown in FIG. 3). Alternatively or in combination, the amount of gas provided to the premix tank may be controlled in other ways, such as by providing a fixed flow of the process gas for a period of time, measuring a change in the temperature of the premix tank as it fills, or by use of a flow measuring device, such as a mass flow meter, or the like. After the desired amount of the first gas flows into the premix tank 108 a second gas may be provided by another one of the gas supplies 102/114 in the manner described above. This process of providing gases individually from the gas supplies 102/114 is continued until the desired number of gases in the desired amounts is provided to the premix tank 108. After the premix tank 108 is filled with the desired number of gases, one or more of the line-out valves 322A-D may be opened or closed to selectively allow the two or more gases to flow from the premix tank 108 to the conduits 318A-D.

Alternatively, to direct the two or more gases to the foreline 314, the tank valve 306 and line-out valves 322A-D are closed and the flow valve 310 and foreline valve 312 are opened, thereby allowing the two or more gases to flow into the foreline 314.

Although only one premix gas box 109 is shown in FIG. 3, any number of premix gas boxes may be provided to accommodate providing the gases to the gas delivery zones (as described above), for example, in accordance with any desired process recipe (e.g., gas ratios, amount of each gas mixture needed, or the like).

Returning to FIG. 1B, in some embodiments, the gas delivery system 100 may further comprise a flow controller 110 disposed between the premix tank 108 and the one or more gas delivery zones 112 to control a flow of the premixed gases from the premix tank 108 to the one or more gas delivery zones 112. The flow controller 110 may be any type of flow controller, for example a mass flow controller, mass flow controller in combination with a flow splitter, rotameter, fixed orifice, variable orifice, or the like. In some embodiments, the flow controller 110 may further control the flow ratio of the premixed gases being delivered to a plurality of gas delivery zones (e.g., a ratio of the flow of the gas to the first gas delivery zone 112A to the flow of the gas to the second gas delivery zone 112B). In some embodiments, the flow controller 110 may be confined within a gas box 124 (described below with respect to FIG. 4).

Figure 4:
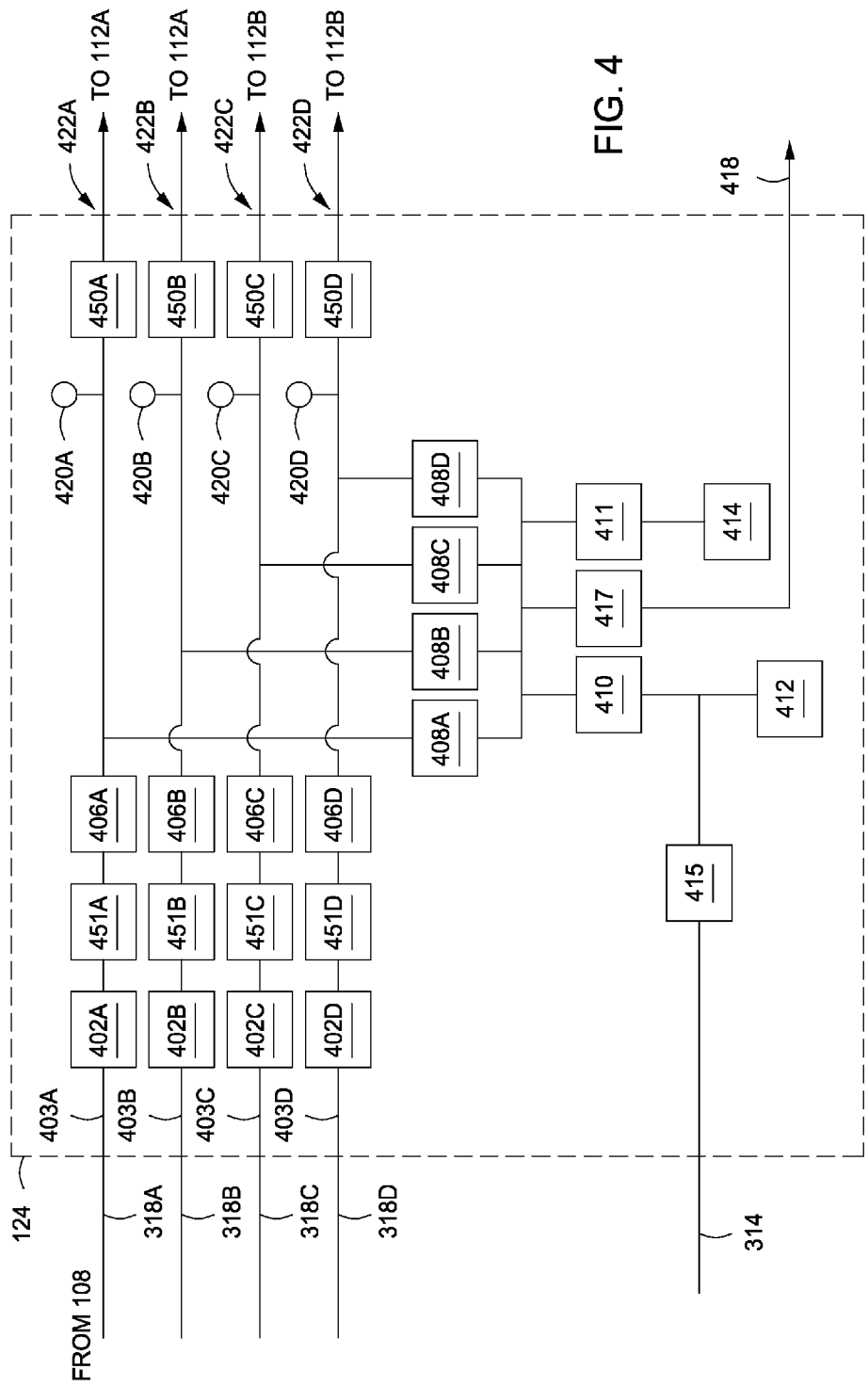
FIG. 4 is a schematic depiction of a gas flow box of a gas delivery system in accordance with some embodiments of the present invention.

Referring to FIG. 4, in some embodiments, the gas box 124 may generally comprise one or more flow paths (four flow paths 403A-D shown) each configured to receive the two or more gases from the conduits 318A-D and provide the two or more gases to the gas delivery zones 112A-B via one or more outlets (four outlets 422A-D shown). Although four flow paths 403A-D are shown, the gas box 124 may have any number of flow paths to facilitate providing the two or more gases from any number of premix tanks to any number of gas delivery zones. For clarity, only one flow path 403A will be described, however it is to be noted that the following description may apply to any number of flow paths utilized in the gas box 124. In addition, although described as being contained within the gas box 124, the elements described herein may also be provided in whole or in part, in separate housings or without a housing.

In some embodiments, the flow path 403A may include a first valve 402A (valves 402B-D for flow paths 403B-D shown) disposed upstream of the flow controller 451A (flow controllers 451B-D for flow paths 403B-D shown) to facilitate isolating the flow path 403A or removing the gas box 124 from the gas delivery system 100 for, for example, maintenance, replacement, cleaning, safety, or the like. Alternatively, or in combination, in some embodiments, the flow path 403A may comprise a second valve 406A (second valves 406B-D for flow paths 403B-D shown) disposed downstream of the flow controller 451A and configured to selectively allow the two or more gases to flow from the flow controller 451A. Each of the first valve 402A or second valve 406A may be any type of valve, for example, such as a switching valve, high speed valve, stop valve, or the like.

In some embodiments, a pressure gauge 420A (pressure gauges 420B-D for flow paths 403B-D shown) may be disposed along the flow path 403A downstream of the flow controller 451A to provide a measurement of pressure within the flow path 403A. In some embodiments, an additional valve 450A (additional valves 450B-D for flow paths 403B-D shown) may be disposed downstream of the pressure gauge 420A to facilitate isolating the flow path 403A or removing the gas box 124 from the gas delivery system 100 for, for example, maintenance, replacement, cleaning, safety, or the like.

In some embodiments, the gas box 124 may further comprise one or more mechanisms to facilitate verification or calibration of the gas flow and/or volume of the two or more gases within the flow path 403A, for example such as a common reference gauge 412 and/or a mass flow verifier 414. In such embodiments, to divert the two or more gases to one of the common reference gauge 412 or the mass flow verifier 414, the gas box 124 may further comprise a first valve 408A (first valves 408B-D for flow paths 403B-D shown) disposed along the flow path 403A between the flow controller 451A and the common reference gauge 412, the mass flow verifier 414, or a foreline 418. In such embodiments, a second valve 410, third valve 411, or fourth valve 417 may be disposed between the first valve 408A and the common reference gauge 412, the first valve 408A and the mass flow verifier 414, and the first valve 408A and the foreline 418, respectively, to facilitate selectively allowing the two or more gases to flow to the common reference gauge 412, the mass flow verifier 414, or the foreline 418. In addition, in some embodiments, the foreline 314 from the premix gas box 109 (described above), may be coupled to common reference gauge 412, mass flow verifier 414 or foreline 418 having a fifth valve 415 disposed thereon to allow gases from the foreline 314 to be directed towards the common reference gauge 412, mass flow verifier 414 or foreline 418.

Figure 5:
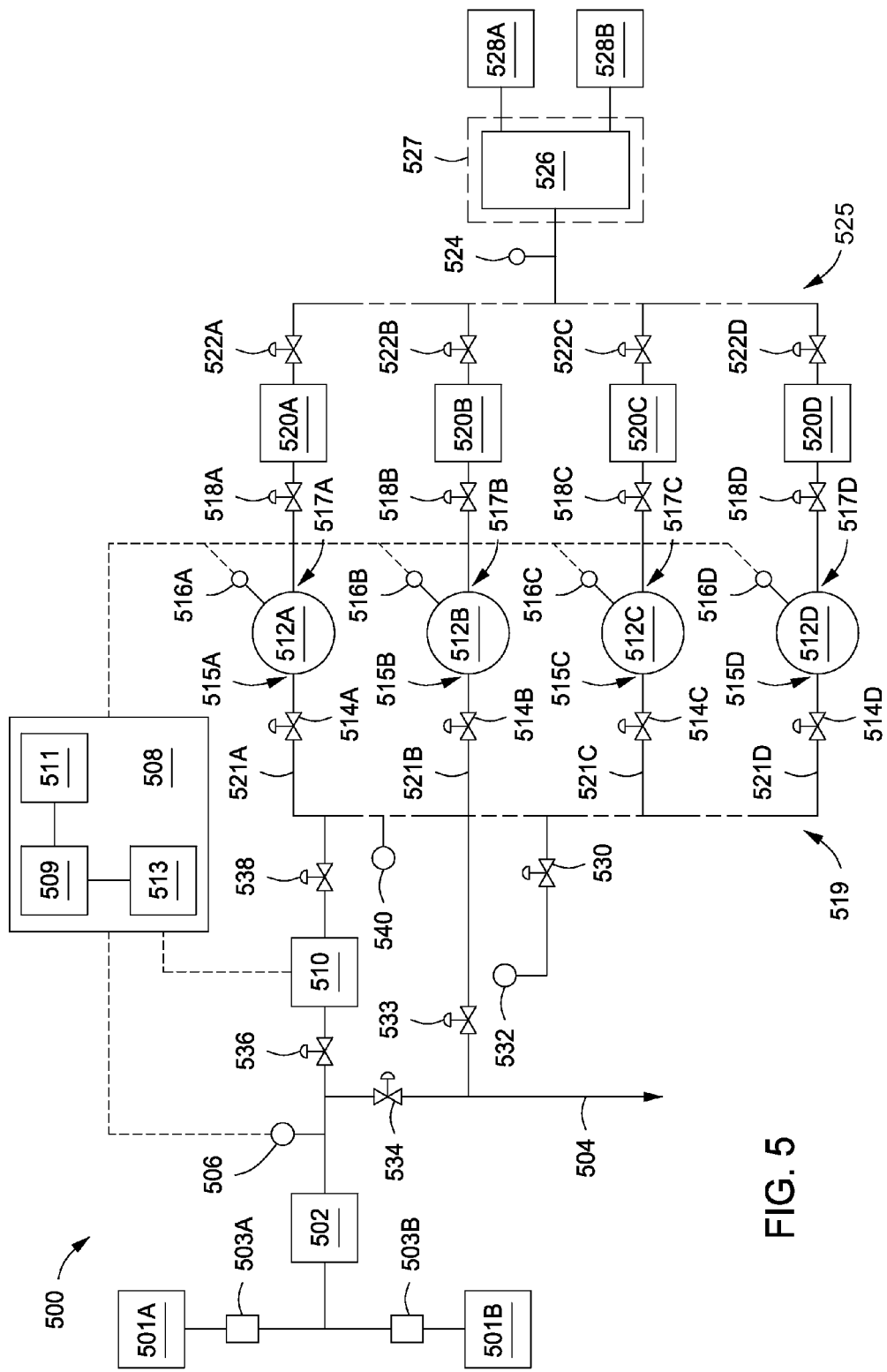
FIG. 5 is a schematic depiction of a gas delivery system in accordance with some embodiments of the present invention.

FIG. 5 is an implementation of a gas delivery system 500 similar to the gas delivery system 100 described above in accordance with some embodiments of the present invention.

As discussed above with respect to FIG. 1, the gas delivery system 500 may be used as a sole source of process gases to be provided to the gas delivery zones 528A, 528B, or, alternatively, in conjunction with one or more additional gas delivery systems.

As shown in FIG. 5, in some embodiments, the gas delivery system 500 may generally comprise one or more premix tanks (four premix tanks 512A-D shown), a plurality of gas supplies (two gas supplies 501A, 501B shown) configured to provide two or more gases to the premix tanks 512A-D, and one or more gas delivery zones (two gas delivery zones 528A, 528B shown) coupled to the premix tanks 512A-D. Each premix tank (four premix tanks 512A-D shown) includes an inlet 515A-D and an outlet 517A-D. Respective ones of the plurality of gas supplies may be coupled to the inlet 515A-D of each of the premix tanks 512A-D, for example, via a manifold 519. The one or more gas delivery zones may be coupled to the premix tanks 512A-D, for example, via a manifold 525.

A pressure or flow controller 510 may be coupled to the gas supplies 501A, 501B to control the flow or pressure of the two or more gases provided to the premix tanks 512A-D. In embodiments where a flow controller 510 is present, the flow controller may be any type of flow controller, for example a mass flow controller, rotameter, or the like. In some embodiments, the flow controller 510 may comprise a fixed orifice configured to provide a flow of gas at a fixed flow rate. Alternatively, or in combination, the flow controller 510 may comprise a sensor, for example such as a thermal sensor, weight sensor, flow sensor, or the like configured to provide a flow rate and/or total flow of the gases flowing to the premix tanks 512A-D. In such embodiments, in operation of the gas delivery system 100, a first gas supply (e.g., gas supply 501A) may provide a first process gas to one or more of the premix tanks 512A-D in a desired amount measured via the sensor, followed by the second gas supply (e.g., gas supply 501B) then providing a second process gas to the premix tank 108 in a desired amount measured via the sensor.

In some embodiments, a single line drop gas box 502, for example, such as the single line drop gas box 106 described above with respect to FIG. 1A, may be disposed between the gas supplies 501A, 501B and the manifold 519. In some embodiments, a first pressure gauge 506 may be disposed between the gas supplies 501A, 501B and the flow controller 510 to provide a measurement of pressure of the two or more gases provided by the gas supplies gas supplies 501A, 501B and/or the single line drop gas box 502 (when present).

The gas supplies 501A, 501B may be any type of gas supply configured to provide any gases (e.g., precursors, carrier gases, process gases, purge gases, cleaning gases, or the like) needed to perform an operation or process in the gas delivery zones 528A, 528B, for example, such as the gas supplies 102, 114 described above with respect to FIG. 1. Although only two gas supplies 501A, 501B are shown in FIG. 5, the gas delivery system 500 may include any number of gas supplies needed to provide any desired number of gases to the gas delivery zones 528A, 528B.

In some embodiments, a one or more valves (two valves shown 503A, 503B) may be coupled to respective gas supplies 501A, 501B to facilitate providing gases from each of the plurality of gas supplies 501A, 501B to the premix tanks 512A-D, for example, such as the valves 116, 118 described above with respect to FIG. 1.

In some embodiments, the gas delivery system 500 may further comprise a plurality of valves (a first valve 534, a second valve 536, and a third valve 533 shown) coupled to the gas supplies 501A, 501B and the manifold 519 to selectively allow the two or more gases to flow to the flow controller 510, directly to the manifold 519, or to a foreline 504. In addition, in some embodiments, additional valves (for example valve 538) may be utilized to isolate components of the gas delivery system 500 (for example, the flow controller 510) to facilitate maintenance, removal, or the like, of the components.

The manifold 519 may be configured to provide the two or more gases to any amount of premix tanks (e.g., premix tanks 512A-D) via any amount of flow paths (four flow paths 521A-D shown) desired, for example, such as shown in the figure. In some embodiments, one or more pressure gauges (two pressure gauges 540, 532 shown) may be coupled to the manifold 519 to provide a measurement of the pressure of the two or more gases within the manifold 519. In some embodiments, one or more valves (one valve 530 shown) may be coupled to one or more of the pressure gauges to facilitate isolating the pressure gauge. In some embodiments, each flow path 521A-D may comprise a valve 514A-D configured to selectively allow the flow of the two or more gases from the manifold 519 to the premix tanks 512A-D.

The premix tanks 512A-D may be any size suitable to accommodate a desired volume of gases to be supplied to the gas delivery zones 528A, 528B. In some embodiments each of the premix tanks 512A-D may be the same size, or in some embodiments, a different size. In addition, the premix tanks 512A-D may be constructed of any material suitable to hold the particular gases being provided from the gas supplies 501A, 501B. Although four premix tanks 512A-D are shown in FIG. 5, the gas delivery system 500 may comprise any amount of premix tanks needed to facilitate providing the two or more gases to the gas delivery zones 528A, 528B in accordance with various process recipes (e.g., varying gas ratios, amount of each gas mixture needed, or the like), for example, such as described above with respect to FIG. 1. In some embodiments, a pressure gauge 516A-D may be coupled to each of the premix tanks 512A-D to provide a measurement of pressure in each of the premix tanks 512A-D.

In some embodiments, a mass flow controller 520A-D is coupled to each of the premix tanks 512A-D to control the flow of the two or more gases from each of the premix tanks 512A-D to the gas delivery zones 528A, 528B. In some embodiments, one or more valves (two valves 518A-D, 522A-D per mass flow controller 520A-D shown) may be coupled to each of the mass flow controllers 520A-D to selectively allow the two or more gases to flow from one or more of the premix tanks 512A-D and/or to facilitate maintenance, removal, or the like of the mass flow controllers 520A-D. In some embodiments, a pressure gauge 524 may be coupled to the manifold 525 to provide a measurement of pressure as the two or more gases flow through the manifold 525.

In some embodiments, the gas delivery system 500 may further comprise a flow controller 526 disposed between the premix tanks 512A-D and the gas delivery zones 528A, 528B to control a flow of the two or more gases from the premix tanks 512A-D to the gas delivery zones 528A, 528B. The flow controller 526 may be any type of flow controller, for example a mass flow controller, rotameter, or the like. In some embodiments, the flow controller 526 may be confined within a gas box 527, for example, such as the gas box 124 described above with respect to FIG. 4.

In some embodiments, a controller 508 may be coupled to at least one of the first pressure gauge 506, flow controller 510, or premix tank pressure gauges 516A-D to control operation or record measurements thereof. The controller 508 may generally comprise a central processing unit (CPU) 509, a memory 511, and support circuits 513. The controller 508 may be one of any form of general-purpose computer processor that can be used in an industrial setting for controlling various chambers and sub-processors. The memory 511, or computer-readable medium may be one or more of readily available memory such as random access memory (RAM), read only memory (ROM), floppy disk, hard disk, or any other form of digital storage, local or remote. The support circuits 513 are coupled to the CPU 509 for supporting the processor in a conventional manner. These circuits include cache, power supplies, clock circuits, input/output circuitry and subsystems, and the like. The memory 511 stores software (source or object code) that may be executed or invoked to control the operation of the gas delivery system 500 in the manner described herein.

In operation of the gas delivery system 500, the gas supplies 501A, 501B provide two or more gases in a desired ratio to the premix tanks 512A-D via the single line drop gas box 502 and manifold 519. The controller 508 controls the pressure of the two or more gases provided to the premix tanks 512A-D. The two or more gases mix in the premix tanks 512A-D and are provided to the flow controller 526 via the manifold 525. The mass flow controllers 520A-D control the flow of the two or more gases from the premix tanks 512A-D to the flow controller 526. The flow controller 526 divides the two or more gases and provides the two or more gases to the gas delivery zones 528A, 528B at a desired flow rate.

Figure 6A:
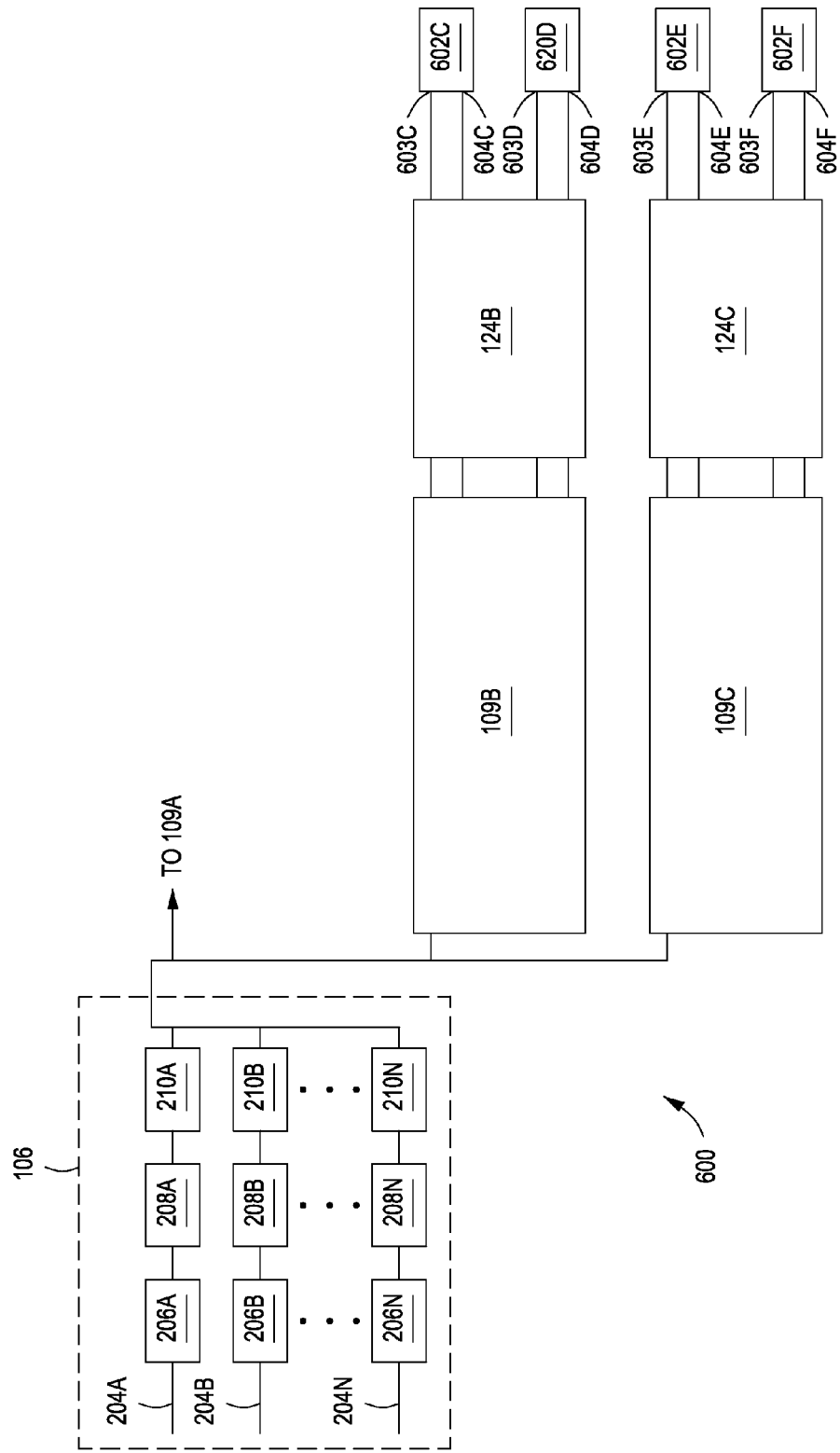
FIGS. 6A-B together are a schematic depiction of a gas delivery system in accordance with some embodiments of the present invention.
Figure 6B:
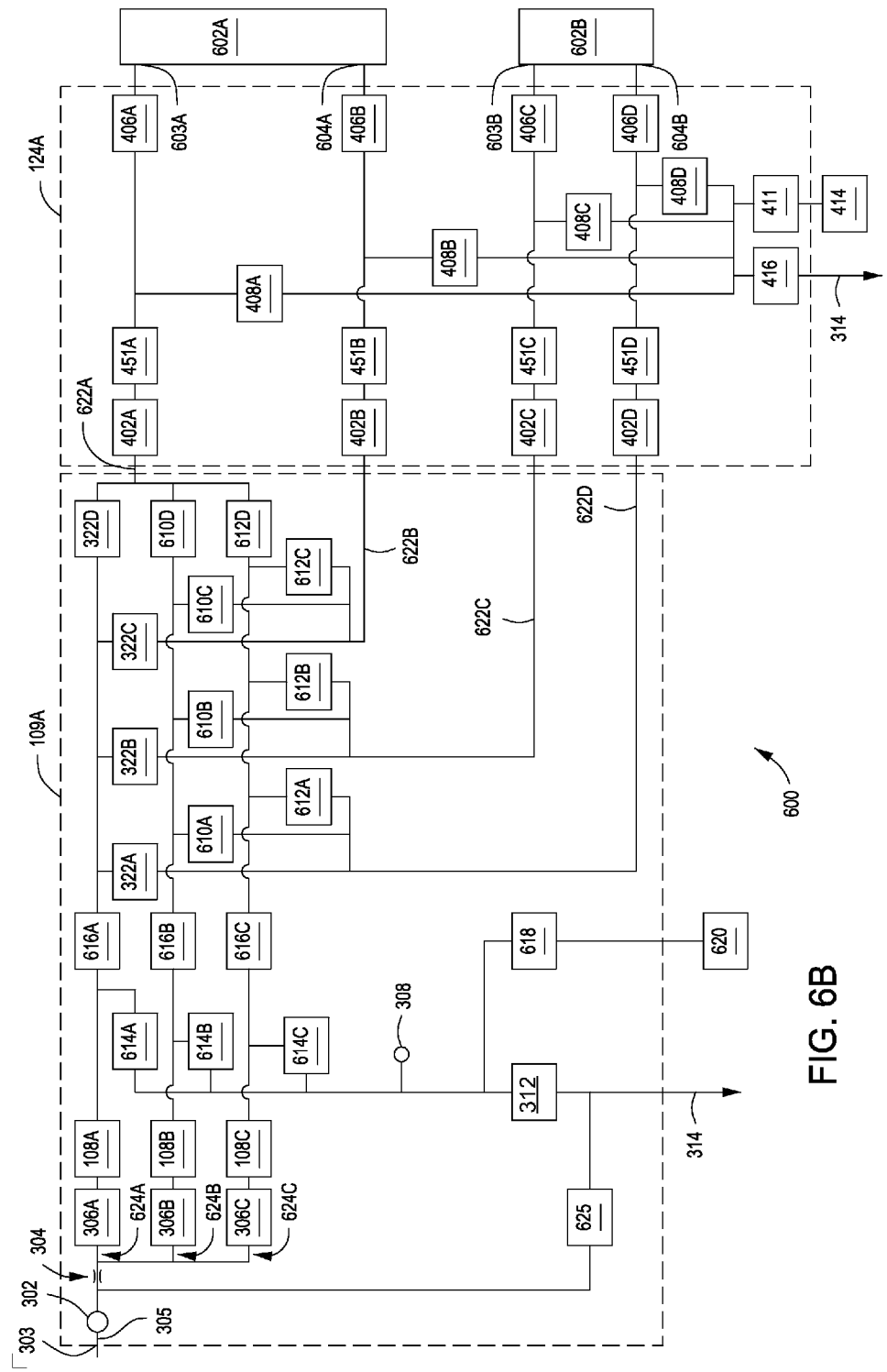

FIGS. 6A and 6B, collectively referred to as FIG. 6, is an implementation of a gas delivery system 600 similar to the gas delivery system 100 described above in accordance with some embodiments of the present invention.

As shown in FIG. 6, the gas delivery system 600 may generally comprise a single line drop gas box 106, one or more premix gas boxes (three premix gas boxes 109A-C shown), one or more gas boxes (three gas boxes shown 124A-C) and one or more gas delivery zones (e.g. six process chambers 602A-F shown). For clarity, only one of each component of the gas delivery system 600 (e.g. premix gas box 109A, gas box 124A and process chamber 602A) will be described, however it is to be noted that the following description may apply to any number of component that may be utilized in the gas delivery system 600. In addition, although some elements are described as being contained within a box (e.g. single line drop gas box 106, premix gas box 109A or process chamber 602A), the elements described herein may also be provided in whole or in part, in separate housings or without a housing.

The single line drop gas box 106 (described fully above) may comprise any amount of flow paths 204A-N suitable to accommodate for any amount of gases needed for a particular process recipe. In some embodiments, each flow path 204A-N may comprise one or more valves (one valve 206A-N and one second valve 210A-N per flow path 204A-N) and optionally one or more filters or purifiers (one filter or purifier 208A-N per flow path 204A-N shown), for example, such as described above with respect to FIG. 2. The single line drop gas box 106 may be configured to provide the gases to any amount of premix gas boxes 109A-C.

In some embodiments, the premix gas box 109A may generally comprise an inlet 303 configured to receive gases from the single line drop gas box 106 coupled to a first flow path 305 configured to provide the gases to one or more flow paths (three flow paths 624A-C shown). Each flow path 624A-C comprises a premix tank 108A-C, each having a respective tank valve 306A-C and configured to provide the mixed gases to one or more flow paths (four flow paths 622A-D shown). The first flow path 305 may include a valve 302 to facilitate isolating the premix gas box 109A and/or removing the premix gas box 109A from the gas delivery system 600, for example, for maintenance, replacement, cleaning, safety, or the like. In some embodiments, the first flow path 305 may further comprise a flow restrictor 304 to restrict the flow of the two or more gases as they flow into the premix tank 108A.

For clarity, only one flow path 624A will be described, however it is to be noted that the following description may apply to any number of flow paths that may be utilized in the premix gas box 109A.

In some embodiments, the flow path 624A may comprise a tank valve 306A configured to selectively allow the gases to flow into the premix tank 108A or to a foreline 314. A first foreline valve 625 may be disposed between the tank valve 306A and foreline 314 to prevent the gas to flow to the foreline 314 when filling the premix tank 108A.

In some embodiments, the flow path 624A may further comprise a first valve 614A (valves 614B-C shown for flow paths 624B-C, respectively) configured to selectively allow the gases to flow from the premix tank 108A to a pressure gauge 308. In some embodiments a foreline valve 312 and/or a common reference gauge valve 618 may be disposed downstream of the pressure gauge 308 to selectively allow the gases to flow to the foreline 314 or common reference gauge 620, respectively. In some embodiments, the flow path 624A may further comprise a second valve 616A (second valves 616B-C shown for flow paths 624B-C shown) configured to isolate the premix tank 108A from the gas box 124A.

In some embodiments, the flow path 624A may comprise one or more line-out valves 322A-D (valves 610A-D and 612A-D shown for flow paths 624B-C, respectively) configured to selectively allow the flow of gases from the premix tank 108A to the flow paths 622A-D.

In operation, to fill the premix tank 108A, the tank valve 306A is opened and the first foreline valve 625 is closed, thereby allowing a first gas to flow into the premix tank 108A. As the premix tank 108A is filled with the first gas, the internal pressure of the premix tank 108 may be monitored via the pressure gauge 308. After the desired amount of the first gas flows into the premix tank 108A a second gas may be provided in the manner described above. This process of providing gases individually is continued until the desired number of gases in the desired amounts is provided to the premix tank 108A. After the premix tank 108A is filled with the desired number of gases, one or more of the line-out valves 322A-D may be opened or closed to selectively allow the two or more gases to flow from the premix tank 108 to the flow paths 622A-D. To direct the gases to the foreline 314 prior to filling the premix tank 108A, the tank valve 306A is closed and the first foreline valve 625 is opened, thereby allowing the gases to flow into the foreline 314. To direct the gases to the foreline 314 after the premix tank 108A is filled, the first valve 614A and/or second valve 616A is closed and the foreline valve 312 is opened, thereby allowing the gases to flow into the foreline 314.

Although the above exemplary operation describes a sequence of filling the premix tank 108A with a desired amount of two or more gases and subsequently allowing the two or more gases to flow from the premix tank 108A, it is to be understood that in embodiments where more than one premix tank is utilized (e.g., premix tanks 108A-C shown in FIG. 6) the one or more premix tanks 108A-C may be filled sequentially or simultaneously. For example, in some embodiments, as the two or more gases flow from a first premix tank (e.g., premix tank 108A) another premix tank (e.g., premix tank 108B) may be filled with a desired number of gases. Alternatively, two or more of the premix tanks may be simultaneously filled, filled on a staggered schedule, or the like as desired.

In addition, the inventors have observed that in the above exemplary operation describing the sequence of filling a premix tank (e.g. premix tank 108A) with gases and flowing the gases from the premix tank, the ability to fill, flow and then re-use the premix tank for subsequent mix requirements advantageously allows for elimination of multiple flow control devices for controlling the mix and flow of the gases typically utilized in conventional gas delivery systems by replacing the multiple flow control devices with premix tanks and single flow units for each output zone. For example, a conventional gas delivery system having about 36 gas flow control devices and about 4 gas flow outputs could be replaced with significantly fewer premix tanks (e.g. 10 premix tanks) and about 4 gas flow outputs by utilizing the inventive gas delivery system.

The gas box 124A (described above) receives the gases from the premix gas box 109A and provides the gases at a desired flow rate to the one or more process chambers 602A. In some embodiments, the one more process chambers may comprise multiple gas delivery zones, for example an inner and outer gas delivery zone. In such embodiments, the gas box 124A may provide the gases to each gas delivery zone via a separate input, for example such as a first inlet 603A and second inlet 604A of the process chamber 602A (first inlets 603B-F and second inlets 604B-F for process chambers 602B-F shown).

Thus, embodiments of a gas delivery system and methods of use thereof have been provided herein. In some embodiments, the inventive gas delivery system may advantageously premix separate process gases prior to delivering the process gases to processing equipment at a desired flow rate. In some embodiments, the inventive gas delivery system may advantageously provide for additional process gases to be added to a process recipe with reduced hardware as compared to conventional gas delivery systems. In some embodiments, the gas delivery system may advantageously have a smaller size and lower cost as compared to conventional gas delivery systems. In some embodiments, the inventive gas delivery system may advantageously process gases to be adjusted during a process as needed, thereby providing increased flexibility over conventional gas delivery systems. The timing and reusability of the premix apparatus as disclosed herein may facilitate complex next generation applications having tens of steps with, for example, 18 or more gas mixes.

While the foregoing is directed to embodiments of the present invention, other and further embodiments of the invention may be devised without departing from the basic scope thereof.

The invention claimed is:

1. A gas delivery system for a process chamber, comprising:
   a plurality of premix tanks each having an inlet and an outlet;
   a plurality of gas supplies coupled to the inlet of each of the plurality of premix tanks;
   a plurality of valves, each valve respectively disposed in line with a corresponding one of the plurality of gas supplies;
   a plurality of conduits coupling the outlets of the plurality of premix tanks to one or more gas delivery zones disposed in one or more process chambers; and
   a gas box coupled between the plurality of gas supplies and the plurality of premix tanks to provide at least one flow path from the plurality of gas supplies to each of the plurality of premix tanks, wherein each flow path of the at least one flow path comprises a first valve disposed within the gas box.

2. The gas delivery system of claim 1, wherein the plurality of gas supplies and plurality of valves are configured to provide two or more gases in a desired ratio to the plurality of premix tanks such that the two or more gases in the desired ratio can be provided from the plurality of premix tanks to the one or more gas delivery zones.

3. The gas delivery system of claim 1, wherein the one or more delivery gas zones include one or more of gas zones of a plurality of process chambers, or gas zones of a single process chamber.

4. The gas delivery system of claim 1, wherein each flow path of the at least one flow path further comprises a purifier or filter.

5. The gas delivery system of claim 1, wherein each flow path of the at least one flow path further comprises a second valve.

6. The gas delivery system of claim 2, further comprising a plurality of flow controllers, one each respectively coupled to the plurality of conduits between the plurality of premix tanks and the one or more gas delivery zones to control a flow of gas from the plurality of premix tanks to the one or more gas delivery zones.

7. The gas delivery system of claim 6, wherein the plurality of conduits comprises a plurality of valves disposed between the plurality of flow controllers and the one or more gas delivery zones configured to selectively allow the two or more gases to flow to one of the one or more gas delivery zones, a mass flow verifier, a common reference gauge, or a foreline.

8. The gas delivery system of claim 6, further comprising a pressure gauge disposed between each flow controller and the one or more gas delivery zones to provide a measure of pressure within respective conduits of the plurality of conduits.

9. The gas delivery system of claim 2, further comprising a plurality of pressure gauges coupled to the plurality of premix tanks to provide a pressure of each of the two or more gases in the plurality of premix tanks.

10. The gas delivery system of claim 2, further comprising a plurality of valves disposed between the plurality of gas supplies and the plurality of premix tanks to selectively provide the two or more gases to one of the plurality of premix tanks or a foreline.

11. The gas delivery system of claim 2, further comprising a plurality of flow restrictors respectively coupled to the plurality of premix tanks to reduce a flow of the two or more gases into the plurality of premix tanks.

12. The gas delivery system of claim 2, further comprising a pressure controller disposed between the plurality of gas supplies and the plurality of premix tanks to control the pressure of the two or more gases provided to the plurality of premix tanks.

13. A gas delivery system, comprising:
   a plurality of premix tanks each having an inlet and an outlet;
   a plurality of gas supplies coupled to respective inlets of the plurality of premix tanks via a respective plurality of valves to selectively flow one or more gases from the plurality of gas supplies into the plurality of premix tanks;
   a plurality of conduits coupling respective outlets of the plurality of premix tanks to one or more gas delivery zones; and
   a plurality of valves disposed in line with the respective outlets of the plurality of premix tanks to selectively flow the one or more gases from the plurality of premix tanks to the one or more gas delivery zones, wherein the one or more gas delivery zones are disposed in one or more process chambers.

14. The gas delivery system of claim 13, further comprising:
    a gas box coupled between the plurality of gas supplies and the plurality of premix tanks to provide at least one flow path from the plurality of gas supplies to at least one of the plurality of premix tanks, wherein each of the at least one flow path comprises a valve disposed within the gas box.

15. A method of providing gas to a gas delivery zone, comprising:
    providing a first gas from a first gas supply to a first premix tank coupled to one or more gas delivery zones;
    providing a second gas from a second gas supply to the first premix tank;
    mixing the first gas and second gas in the first premix tank to form a first mixed gas;
    providing the first mixed gas from the first premix tank to the one or more gas delivery zones;
    providing the first gas from the first gas supply to a second premix tank coupled to the one or more gas delivery zones;
    providing the second gas from the second gas supply to the second premix tank;
    mixing the first gas and second gas in the second premix tank to form a second mixed gas; and
    providing the second mixed gas from the second premix tank to the one or more gas delivery zones, wherein providing the first gas to the second premix tank and providing the second gas to the second premix tank is performed while providing the first mixed gas from the first premix tank to the one or more gas delivery zones.

16. The method of claim 15, wherein providing the first mixed gas to the one or more gas delivery zones comprises:
    providing the first mixed gas to the to one or more gas delivery zones at a desired flow rate via a flow controller coupled to the one or more gas delivery zones.

17. The method of claim 15, further comprising:
    monitoring a pressure within the first premix tank while providing the first gas and not the second gas to the first premix tank to provide the first gas in a desired amount; and
    subsequently monitoring the pressure within the first premix tank while providing the second process gas and not the first process gas to the first premix tank to provide the second gas in a desired amount.

18. The method of claim 15, further comprising:
    providing the first gas without the second gas to the first premix tank for a first period of time to provide a desired amount of the first gas to the first premix tank; and
    subsequently providing the second gas without the first gas to the first premix tank for a second period of time to provide a desired amount of the second gas to the first premix tank.

* * * * *